June 25, 1963  R. A. MORRISON  3,095,106
AUTOMATIC RIVET SETTING TOOLS
Filed Dec. 28, 1961  3 Sheets-Sheet 1

Inventor
Ralph A. Morrison
By his Attorney

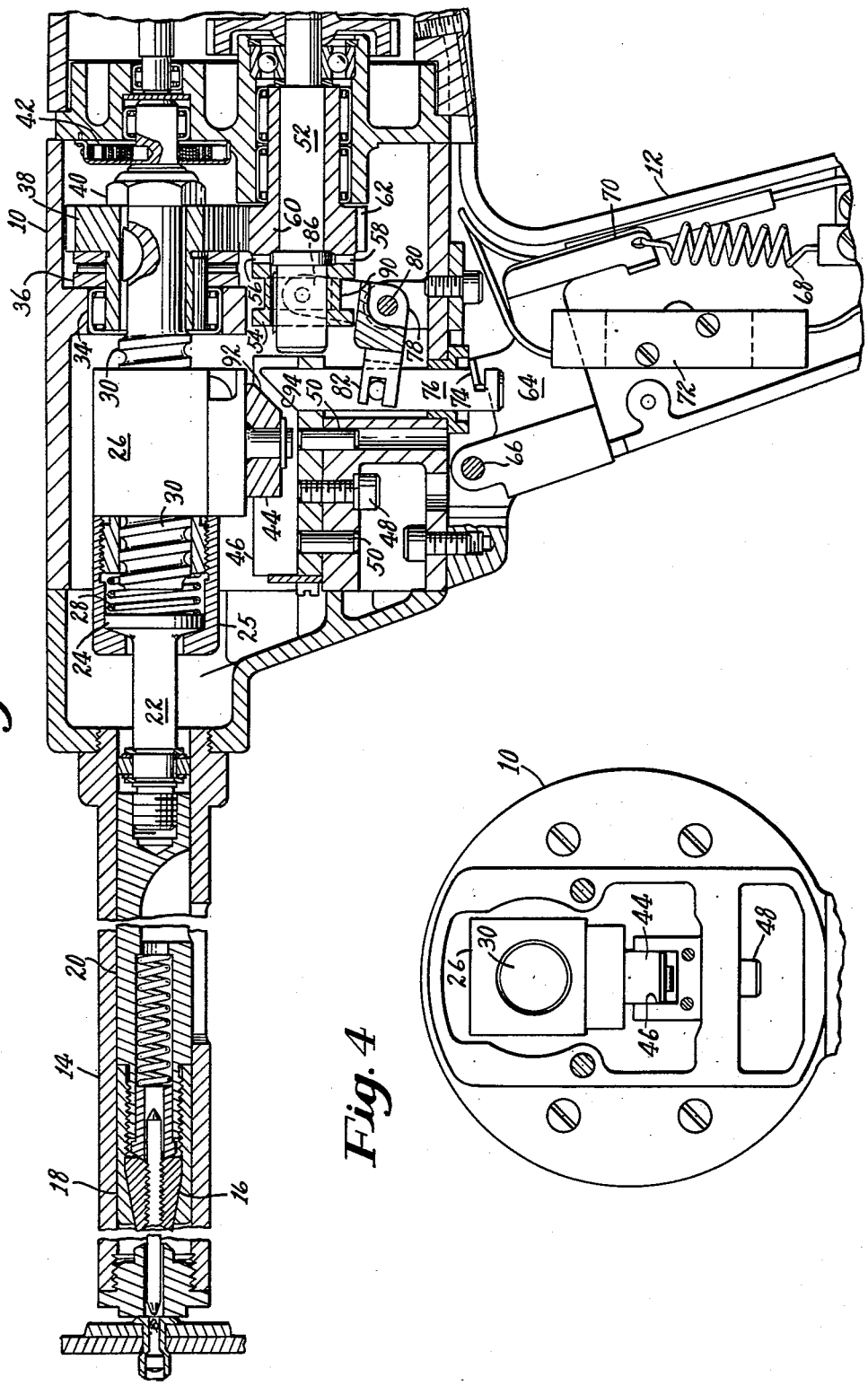

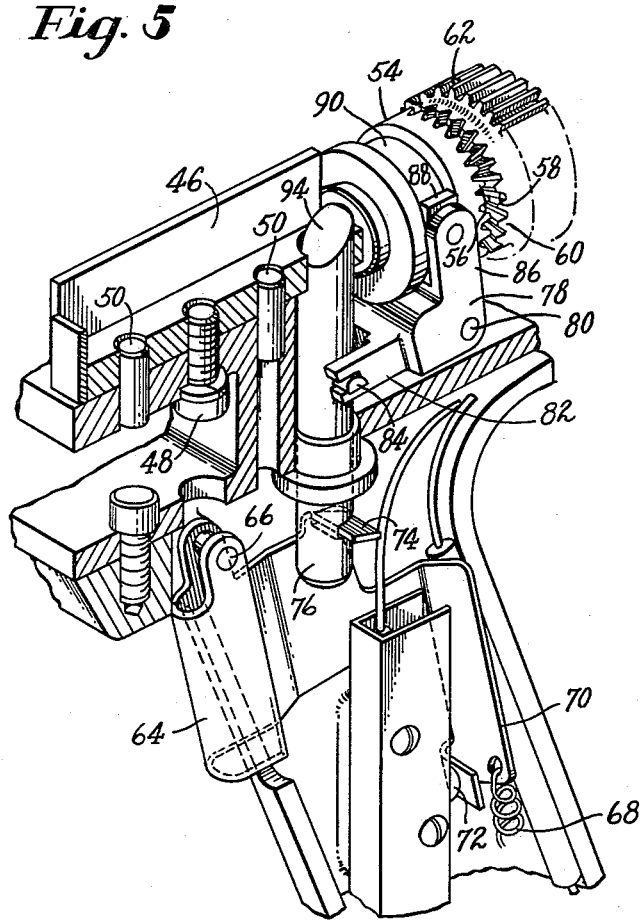

:::::::::::::::::::::::::::::::::::::::::::::::::::::::::::::::::::::::::::::::::::::::::::::::::::::::::::::::::::

United States Patent Office 3,095,106
Patented June 25, 1963

3,095,106
AUTOMATIC RIVET SETTING TOOLS
Ralph A. Morrison, Topsfield, Mass., assignor to United Shoe Machinery Corporation, Boston, Mass., a corporation of New Jersey
Filed Dec. 28, 1961, Ser. No. 162,804
7 Claims. (Cl. 218—42)

This invention relates to a portable power operated tool for the setting of blind rivet assemblies wherein the mandril stem portion of an assembly is gripped and axial tension is then applied to the stem to pull and set the rivet. In particular, it relates to a rivet setting tool wherein the axial tensioning force is derived from an electric motor, the rotary output torque of which is transmitted, through a clutch and reduction gear train, to a ball bearing jack screw and nut assembly which is so constructed and arranged that rotation of the screw in a given direction by the motor drive produces a rearward linear retractive movement of the nut to which the gripping and tensioning means are connected.

An object of the invention is to provide a lightweight, powerful and durable portable electric tool, which is semiautomatic in operation and may be handled with ease by an operator rapidly and effectively to set a series of rivet assemblies.

One of the advantageous features of this rivet setting tool is that a single trigger control is provided to initiate the energization of the electric motor and to engage the clutch for applying the axial tensioning force to the stem of the rivet mandril.

Another feature is that, once the tensioning force is applied to the rivet stem, the clutch will remain engaged until the mandril stem becomes severed, even though the trigger be released by the operator before the rivet is set.

Another feature is the provision of automatic means for disengaging the clutch and for deenergizing the electric motor at the completion of each rivet setting operation.

Still another advantageous feature of this invention is the provision of automatic means for rapidly restoring the retracted rivet tensioning mechanism to its original rivet stem receiving position in response to the automatic disengagement of the clutch.

These and other features of the invention will now be described in detail in connection with the drawings and will be pointed out in the appended claims.

In the drawings,

FIG. 3 is a view similar to that of FIG. 2, but showing the parts as viewed toward the end of a rivet setting operation;

FIG. 4 is a section, taken along the line IV—IV of FIG. 2, showing parts as viewed in the direction of the arrows; and FIG. 5 is a perspective view showing details of the trigger control and clutch actuating mechanism.

Figure 1:
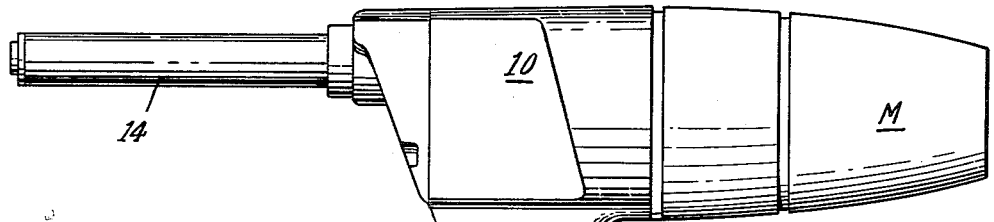
FIG. 1 is a side elevation of a power rivet setting tool embodying the present invention.
Figure 2:
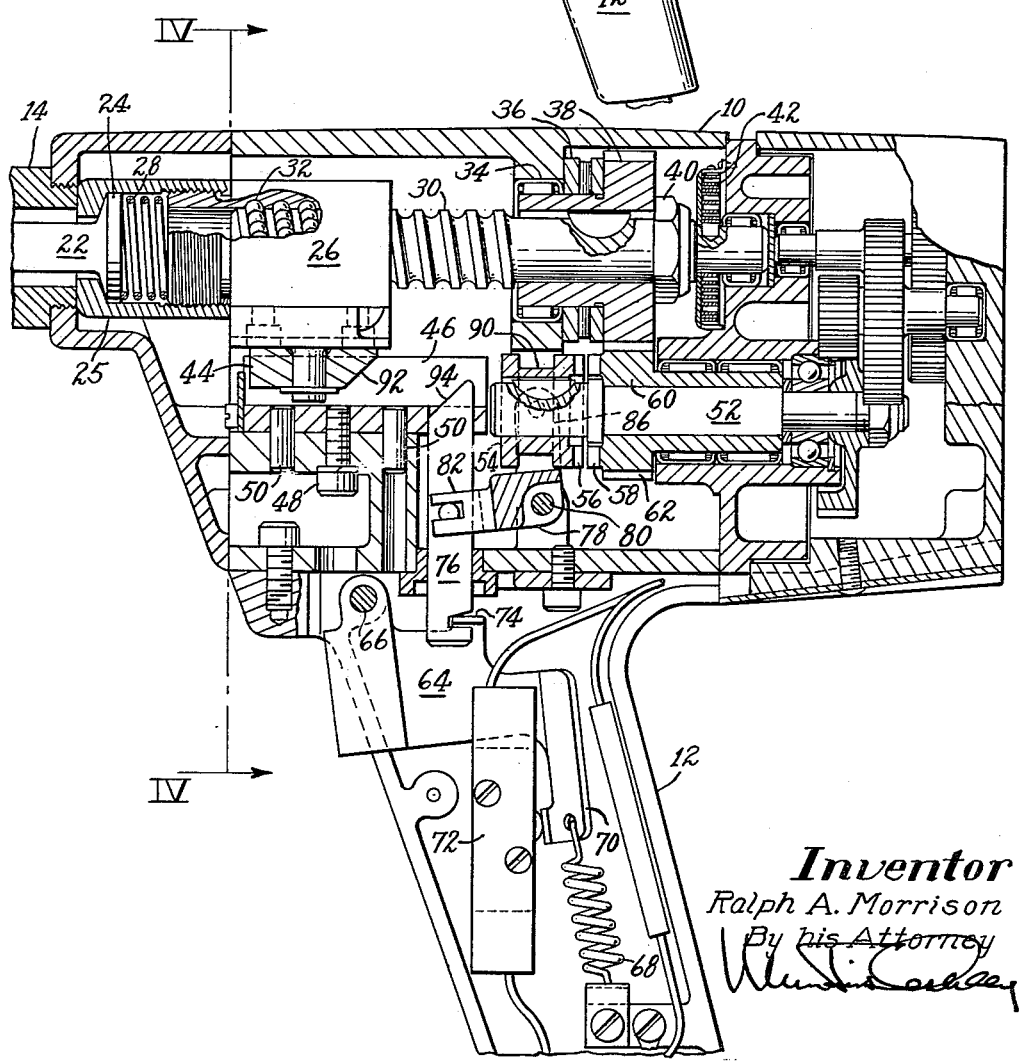
FIG. 2 is a sectional view, showing parts of the tool prior to the commencement of an operating cycle.

Referring to the drawings, and in particular to FIGS. 1–3, the illustrated power tool comprises a main body portion 10 providing a frame and housing for the rotary power operating mechanism, a handle portion 12 within which the operating controls are located, and a detachable nose piece unit 14 within the forward end of which the mandril engaging and gripping means are retractably mounted. Due to the fact that any given nose piece is restricted to a certain size range in the rivets that it is capable of being employed with, this invention contemplates the provision of a basic power tool which may be used for setting a great variety of sizes and types of rivets merely by employing different units of a series of quickly interchangeable nose pieces 14. The nose piece unit, as illustrated in FIGS. 1 and 3, is of a well-known construction and is similar to the nose piece illustrated and described in United States Letters Patent No. 2,845,-197, issued July 29, 1958, in the name of Charles Newstead. Inasmuch as there are numerous well-known types of nose pieces that might advantageously be used with the basic pulling tool of this invention, all that herein need be said is that there are located toward the front end of the nose piece one or more mandril stem engaging members, such as the jaws 16, FIG. 3, for gripping a portion of the mandril stem when inserted into the barrel of the nose piece. The jaws 16 are operatively mounted in a jaw case 18 secured to the forward end of a slide bolt 20 which, in turn, is detachably secured by threads to a power actuated pull bolt 22. The rear end of the nose piece barrel is also detachably screwed onto a threaded sleeve projection at the forward end of the body portion 10, so that when a nose piece is thus detachably secured any rearward or forward movement of the pull bolt 22 will impart either a corresponding retractive tensioning movement or an extending forward return movement to the mandril engaging jaws 16. The rear end of the pull bolt 22 is provided with an enlarged root portion 24 encased within a cylindrical bore provided internally of a cap screw 25 threadedly connected to the forward end of an axially movable nut member 26, and the threaded end of the pull bolt 22 is held forwardly extended out of the bore by a compression spring 28 nested between the rear end of the bolt 22 and the forward end of the nut member 26. The nut 26 is cooperatively assembled with a jack screw member 30; there being a series of friction reducing ball bearings 32 interconnecting the thread grooves of nut 26 with the grooves of the screw member 30. The screw member 30 is suitably supported for rotation in the housing frame 10 by a radial bearing 34 and a thrust bearing 36, both of which are journaled on the skirt portion of a gear 38 which is keyed to the rear shaft of the member 30 and is held affixed thereon by a threaded nut 40. A torsion spring 42, also connected to the rear shaft of the jack screw member 30, and having its interior coil end secured thereto, is loaded by winding the coils in a direction normally to impart a yieldable rotative movement to the screw 30 such as to advance the nut member 26 in a forwardly extended direction. During any rotative movement of the screw member 30, the nut is prevented from rotation and is restricted to a forwardly and rearwardly directed path of movement by a guide lug 44, FIG. 4, secured to the lower portion of the nut member 26 and slidable, concomitantly with the nut, along a forward and rearwardly directed guide track defined by a U-shaped guide rail 46, affixed to the housing frame by a screw 48 and pins 50. Thus, when there is no motive power engaged with the gear 38, the force of the torsion spring 42 will rotate the screw member 30 in a direction to advance the nut 26 and to extend the nose piece jaws 16 to their forward position whereat they are opened to receive or to release a mandril stem. However, in order forcefully to retract the nut 26 and jaws 16, thereby to set a rivet, the screw member may be rotated positively in a direction opposite to the yieldable force of the torsion spring 42 by the rotary movement of a gear train that is power driven by an electric motor M, located at the rear of the housing 10. For the sake of both economy and weight reduction, the motor M is preferably of the small fractional horsepower variety wherein the required amount of torque to be imparted to the screw member 30 is derived by a combination of reduction gearing for driving a power shaft 52. The shaft 52 is positively rotated whenever the electric motor is energized, and the shaft extends through and has keyed to its forward end a driving clutch member 54 which is shiftable axially along a splined sliding keyway, and which is provided with a rearwardly directed clutch engaging face having a circular series of tapered teeth 56, FIG. 5. When the driving clutch member 54 is shifted rearwardly, FIG. 3, the clutch teeth 56 engage and mesh with a complementary tapered series of teeth 58 formed on the forward clutch face of a driven clutch member 60 which is freely rotatably mounted upon a central portion of the power shaft 52. Thus, excepting when the teeth of the pair of clutch faces are engaged together, the driven clutch member 60 may be freely rotated about the shaft 52. The driven clutch member 60 also comprises a gear having its peripheral gear teeth 62 continuously in mesh with the teeth of the gear 38 which is keyed to the shaft of the rotatable screw member 30.

The control mechanism for actuating the clutch and for energizing the motor M is best illustrated in FIG. 5 which shows the parts in their disengaged or inoperative position. A trigger member 64 is pivotally mounted within the handle portion 12 by a pin 66, and the trigger is normally biased into the inoperative position by a spring 68 pulling downward on a trigger arm 70 to force the arm against the control button of a normally closed microswitch 72 which is wired in series with the circuit of the motor M. A laterally extending fin 74, formed as a portion of the trigger 64, is disposed within a transverse notch provided in the rear lower portion of a slide bolt 76 which is journaled in the tool frame for vertical movement. A clutch actuating lever 78, pivotally mounted on a fixed pin 80, and in the form of a bell crank having double bifurcated lever arms, has its forwardly extending lever arms 82 operatively connected to the slide bolt 76 by a transverse trunnion pin 84, and has its upwardly extending arms 86 operatively connected to the shiftable driving clutch member 54 by a pair of articulated blocks 88 each diametrically disposed within an annular circumferential groove 90 formed in the clutch member 54. Manual pivotal movement of the trigger 64, in a counterclockwise direction opposed to the force of the biasing spring 68, moves the trigger arm 70 away from the microswitch control button, FIG. 3, thus energizing the electric motor to rotate both the power shaft 52 and the driving clutch member 54 which is slidably keyed thereon. Simultaneously, the same movement of the trigger 64 elevates the trigger fin 74 to raise the slide bolt 76, thus causing the actuating lever 78 to be shifted clockwise about its pivot pin 80. The resulting rearward movement of the blocks 88 carries the clutch member 54 rearwardly along its sliding keyway to engage the power driving clutch teeth 56 with the teeth 58 of the driven clutch member 60. The foregoing engagement of both clutch members and the energization of the motor M cause the screw member 30 to be rotated positively in a direction to retract the nut member 26 rearwardly, and said directional rotation progressively increases the torsional energy thus imparted to the coil spring 42.

Rearward movement of the nut 26, FIG. 3, along the guide rail 46 retracts the gripping jaws 16 to tension the mandril stem until the rivet is set and the stem becomes severed. After severance of the mandril stem, the operator can quickly restore the power tool to its original inoperative condition merely by releasing the trigger 64, whereupon the force of the spring 68 will reset the trigger to open the microswitch 72 and to shift the driving clutch member 54 out of engagement with the clutch member 60. With the operative driving power for rotating the driven member 60 thus disengaged, the torsional force of the spring 42 will be effective to rotate the screw 30, along with gears 38 and 62, until the nut 26 and the jaws 16 have been forwardly extended to the position of FIG. 2.

If an operator should fail to release the trigger 64, and if the motor drive of the screw member 30 continued to retract the nut 26 and the associated retractive parts beyond the permissive retractive movement, an interlocking and jamming of the power driven parts would result. Accordingly, one of the novel safety features of this invention is the provision of automatic means for resetting the trigger after a retractive movement of the nut sufficient to set a rivet and to sever the mandril, but before an excessive retraction of the nut 26 produces a jamming of the associated parts. To this end the guide lug 44, which is secured to the nut 26, carries a rearwardly directed cam face 92. This cam face, during the continued permissive rearward movement of the nut 26, will abuttingly engage with a forwardly directed cam face 94, FIG. 3, on the top of the elevated slide bolt 76 in the event that the operator is still depressing the trigger and holding the cam 94 elevated in the path of the rearwardly moving cam face 92. Thus, if an operator should fail to release the trigger after setting a rivet, the power driven rearward movement of the retractive parts will automatically cam the slide bolt 76 to its lowered position whereat the clutch for the power drive is disengaged, the circuit through the microswitch is opened and the trigger is power returned to the inoperative position of FIG. 2.

While the foregoing automatic safety means, for disengaging the power drive in the event that an operator neglects to release the trigger, will restore the operating parts of the tool to the inoperative condition of FIG. 1, said safety means are only operative after an extensive retraction of the nut 26 has taken place. It frequently happens that a rivet may be completely set and the mandril stem severed by only a slight rearward movement of the nut 26. In the latter event much valuable operating time is needlessly consumed in the continued power operation of the tool after the rivet has been set and until the cam faces 92 and 94 cooperate to disengage the power. Accordingly, the tool of this invention has been constructed so that the trigger may be reset to disengage the operating power as soon as a mandril stem has been severed, provided that the operator has released the trigger soon after engagement of the clutch members. This time saving feature is accomplished by so designing the clutch actuating mechanism that once the clutch has been manually engaged, the radial torque required to rotate the driving clutch member, 54, during the mandril tensioning action will suffice to keep the clutch members in operative engagement until the radial torque suddenly is greatly diminished as a result of the severance of the mandril. It is to be noted that the tool, as illustrated in FIGS. 2 and 3, has been adequately provided with friction reducing means, such as ball and roller bearings of both the thrust and radial load variety. As a result of this, the radial torque, required to be transmitted by the shiftable driving clutch member 54 in order freely to retract the nut 26 without any mandril tensioning resistance being applied thereto, is relatively low and may chiefly be attributed to the torsional loading of the spring 42. Also, while the radial driving torque is relatively low, little force is required to move the clutch member 54 axially along the splined keyway between said member and its power shaft 52; thus, excepting when the tensioning of a mandril stem is resisting movement of the tool parts and imparting a high degree of radial torque between the force transmitting faces of the splined keyway, the tension of the spring 68 is sufficient to disengage the clutch members. However, when the trigger 64 is manually moved against the force of the spring 68 and the retractive gripping movement of the jaws commences to pull against and to stress a rivet mandril, the resulting resistance to the rearward movement of the nut 26 increases the radial torque to a degree that the operator may then release the trigger, and the radial torque between the clutch member 54 and the splined connection on the shaft 52 will suffice to prevent the force of the spring 68 from returning the clutch to its disengaged condition until said torque is relieved by reason of the severance of the mandril stem.

Having thus described my invention, what I claim as new and desire to secure by Letters Patent of the United States is:

1. An automatic power tool for setting blind rivet assemblies, by tensioning a mandril stem portion until said stem becomes severed, comprising: gripping means engageable with the stem of a rivet setting mandril and movable from a forward extended position to a rearward retracted position; a ball bearing jack screw and nut assembly operatively connected with said means; power means, including a rotary electric motor and a shiftable clutch assembly, for rotating the screw in a direction to retract the gripping means; manually operated control means for engaging the clutch; automatic means, responsive to the retraction of the gripping means, for disengaging the clutch; and resilient means, responsive to the disengagement of the clutch, for automatically restoring the gripping means to the forward extended position.

2. An automatic power tool for setting blind rivet assemblies by tensioning a mandril stem portion until said stem becomes severed, comprising: a tool frame, including a housing having a forwardly extending nose piece; mandril stem engaging jaws mounted in the forward end of the nose piece for retractive movement to tension and sever a mandril stem; a ball bearing jack screw and nut assembly comprised of a rotatably mounted screw member, a nut operatively connected by a forward extension to said jaws and cooperating with said screw so as to be axially movable back and forth as the directions of the screw rotation are alternated, and guide means preventing rotation of the nut and defining the path of its axial movements; resilient means imparting a yieldable force for rotating said screw in one direction to cause the nut and jaws to be moved into their forward extended position; and power drive means, including a rotary electric motor and a manually shiftable clutch assembly engageable with the screw, for positively rotating the screw against and in the opposite direction from said yieldable force to cause the nut and jaws to be retracted until said stem is severed.

3. A power tool according to claim 2, wherein the resilient means comprise a torsion spring the inner rotatable coil end of which is secured tangentially to the screw member.

4. A power tool according to claim 2, wherein said clutch assembly comprises a driving member rotatably connected with the motor, and a driven member rotatably connected with the screw and engageable with the driving member, a shiftable actuating lever for engaging and disengaging the clutch members, manual trigger operated means for moving said lever to clutch engaging position and for energizing said motor, and cam means operative in response to the retractive movement of said nut for automatically disengaging said clutch members and for de-energizing the motor.

5. In an automatic power tool, having pulling means engageable with a stem portion of a blind rivet assembly for tensioning the stem to set the rivet and to sever the tensioned stem, a ball bearing jack and nut assembly; means operatively connecting the pulling means with the nut for integral movement therewith; resilient means acting upon the jack screw and imparting a yieldable force normally to rotate the screw in one direction to move the nut axially of the screw in the direction of the pulling means, and a rotary electric motor enageable with the screw for positively rotating the screw in the opposite direction to tension a rivet, the combination of, a shiftable clutch assembly having a driving member connected with the motor and a driven member connected with the screw, an actuator for selectively shifting one of said clutch members into and out of engagement with the other member, manually controlled means for moving the actuator into clutch engaging position and for energizing the motor to initiate the rivet tensioning movement, and automatic means operative in response to said movement for disengaging the clutch members and for de-energizing the motor.

6. In an automatic power tool for setting blind rivet assemblies by tensioning a mandril stem portion until said stem becomes severed: a tool frame, including a housing having a forwardly extending nose piece; mandril stem engaging jaws mounted in the forward end of the nose piece for retractive movement to tension and sever a mandril stem; a ball bearing jack screw and nut assembly comprised of a rotatably mounted screw member, a nut member operatively connected by a forward extension to said jaws and cooperating with said screw so as to be axially movable back and forth as the directions of the screw rotation are alternated, and guide means preventing rotation of the nut and defining the path of its axial movements; resilient means imparting a yieldable force for rotating said screw in a given direction to cause the nut and jaws to be moved into their extended position; and power drive means engageable with the screw for positively rotating the screw against and in the opposite direction from said yieldable force, to cause the nut and jaws to be retracted until said stem is severed; said drive means including a rotary electric motor and a manually shiftable clutch assembly for transmitting power from the motor to rotate the screw in said opposite direction.

7. In a power operated rivet setting tool having means for gripping and pulling a rivet mandril portion to apply thereto a retractive mandril tensioning load until the rivet is set and the mandril becomes severed, a power drive shaft which is rotated by a motor; a driving clutch member slidably keyed to said shaft by a spline connection; a driven clutch member axially alined with and operatively engageable by the driving clutch member for transmitting power to the gripping and pulling means; a clutch actuating lever for selectively shifting the splined driving clutch member axially of the power drive shaft into and out of engagement with the driven clutch member; yieldable resilient biasing means exerting a predetermined force upon said lever normally to move the lever in a direction to shift and hold the splined driving clutch member out of engagement with the driven clutch member; a trigger operatively connected with said lever and manually movable to shift the lever in a direction opposite to the force of said biasing means, thereby to engage said clutch members and to apply a tensioning load to the rivet mandril until the severance thereof; the force of said biasing means being insufficient to shift the splined clutch member once the retractive load has been applied to the mandril and the resulting torque increase has produced a frictional resistance to such shifting movement, but said biasing force being sufficient to shift the splined clutch member out of driving engagement with the driven clutch member upon the reduction of said torque in response to the severance of the mandril, whereby, once manually engaged to impart said retractive load to the mandril the clutch members will remain in driving engagement with each other after the trigger is manually released and until the severance of the mandril.

References Cited in the file of this patent

UNITED STATES PATENTS

| | | |
|---|---|---|
| 2,965,258 | Wilson | Dec. 20, 1960 |
| 3,002,644 | Meyer | Oct. 3, 1961 |